United States Patent
Yanagisaki et al.

(10) Patent No.: US 10,450,784 B2
(45) Date of Patent: Oct. 22, 2019

(54) VERTICALLY SLIDING MANUAL OPENING AND CLOSING DOOR

(71) Applicant: FUJI CORPORATION, Chiryu-shi (JP)

(72) Inventors: Jun Yanagisaki, Toyota (JP); Toshifumi Suzuki, Toyota (JP); Osamu Nagai, Nagoya (JP)

(73) Assignee: FUJI CORPORATION, Chiryu-shi (JP)

( * ) Notice: Subject to any disclaimer, the term of this patent is extended or adjusted under 35 U.S.C. 154(b) by 234 days.

(21) Appl. No.: 15/519,625

(22) PCT Filed: Oct. 24, 2014

(86) PCT No.: PCT/JP2014/078401
§ 371 (c)(1),
(2) Date: Apr. 17, 2017

(87) PCT Pub. No.: WO2016/063421
PCT Pub. Date: Apr. 28, 2016

(65) Prior Publication Data
US 2017/0252883 A1 Sep. 7, 2017

(51) Int. Cl.
*E05C 17/60* (2006.01)
*E05C 17/62* (2006.01)
(Continued)

(52) U.S. Cl.
CPC .............. *E05C 17/60* (2013.01); *E05C 1/10* (2013.01); *E05C 17/62* (2013.01); *E05D 13/04* (2013.01);
(Continued)

(58) Field of Classification Search
CPC .......... E05C 17/60; E05C 3/006; E05C 3/008; Y10T 292/0926; Y10T 292/0928;
(Continued)

(56) References Cited

U.S. PATENT DOCUMENTS

| 352,290 A | * | 11/1886 | Bates | ....................... E06B 7/14 |
| | | | | 52/97 |
| 1,588,741 A | * | 6/1926 | Jones | ..................... E05D 13/06 |
| | | | | 292/DIG. 72 |

(Continued)

FOREIGN PATENT DOCUMENTS

| GB | 190914713 A | * | 6/1910 | ............. E05D 13/06 |
| GB | 175051 A | * | 2/1922 | ............. E05D 13/06 |

(Continued)

OTHER PUBLICATIONS

International Search Report dated Nov. 25, 2014, in PCT/JP2014/078401, filed Oct. 24, 2014.

*Primary Examiner* — Marcus Menezes
(74) *Attorney, Agent, or Firm* — Oblon, McClelland, Maier & Neustadt, L.L.P.

(57) ABSTRACT

A vertically sliding manual opening and closing door with good one-handed operability, including: a plate-like door member configured to open and close an opening section by being slid vertically; a support member configured to guide the vertical sliding of the door member by a support section configured to support left and right end sections of the door member; and a lock mechanism configured to position the door member that has been raised.

7 Claims, 7 Drawing Sheets

(51) Int. Cl.
*E05C 1/10* (2006.01)
*E06B 3/44* (2006.01)
*E06B 5/00* (2006.01)
*B23Q 11/08* (2006.01)

(52) U.S. Cl.
CPC ............... *E05D 13/06* (2013.01); *E06B 3/44* (2013.01); *E06B 5/00* (2013.01); *B23Q 11/0825* (2013.01); *B23Q 11/0891* (2013.01); *Y10T 292/0926* (2015.04); *Y10T 292/0932* (2015.04); *Y10T 292/1051* (2015.04)

(58) Field of Classification Search
CPC ......... Y10T 292/0932; Y10T 292/1051; Y10T 292/1052; Y10T 292/1059; E05D 13/06; E05D 13/04
USPC .................................................... 49/449, 169
See application file for complete search history.

(56) References Cited

U.S. PATENT DOCUMENTS

| | | | | |
|---|---|---|---|---|
| 1,622,742 | A * | 3/1927 | Shipman | E05D 13/06 292/136 |
| 2,324,799 | A * | 7/1943 | O'Connor | E05D 13/06 292/195 |
| 2,503,076 | A * | 4/1950 | Smith | E05D 13/06 126/190 |
| 5,653,068 | A * | 8/1997 | Moody | E06B 7/26 49/408 |
| 7,070,215 | B2 * | 7/2006 | Kelley | E05B 53/003 292/141 |
| 7,240,524 | B1 * | 7/2007 | White | E05B 65/0021 292/144 |
| 2003/0024168 | A1 * | 2/2003 | Mitchell | E05B 65/08 49/449 |
| 2004/0055222 | A1 * | 3/2004 | Rice | E05B 65/0021 49/449 |
| 2013/0305610 | A1 * | 11/2013 | Meeks | E06B 1/70 49/471 |

FOREIGN PATENT DOCUMENTS

| | | |
|---|---|---|
| JP | 26-2306 Y1 | 3/1951 |
| JP | 57-32019 Y2 | 7/1982 |
| JP | 4-12389 U | 1/1992 |
| JP | 4-315547 A | 11/1992 |
| JP | 6-179148 A | 6/1994 |
| JP | 2003-11034 A | 1/2003 |

* cited by examiner

FIG. 7

VERTICALLY SLIDING MANUAL OPENING AND CLOSING DOOR

TECHNICAL FIELD

The present application relates to a door that is opened and closed by being slid vertically, in particular to a vertically sliding manual opening and closing door that can be opened and closed with one hand.

BACKGROUND ART

On a machine tool, a door is provided on a processing chamber covering a processing section such as a main shaft chuck such that an operator can perform work such as maintenance or component exchange inside the processing chamber from the outside. In patent literature 1 below, a safety door is provided that opens and closes around a rotation axis via a hinge, with opening and closing being performed by using a handle. With this conventional art, a small door is formed in the safety door such that a workpiece can be removed and inserted. The small door is a raising and lowering door that is raised and lowered along slide rails, with opening and closing being performed by holding a handle a raising and lowering the small door. A slanted channel is provided on the safety door and the small door to prevent the work floor becoming dirty by having liquid droplets collected by passing through the channel.

CITATION LIST

Patent Literature

Patent Literature 1: JP-A-2003-011034

SUMMARY

When performing maintenance work or the like inside the processing chamber of a machine tool, in many cases one hand holds a tool and the other hand performs opening and closing of the door. Therefore, it is desirable to be able to open and close a door provided on a processing chamber with only one hand. Usually, because a handle is provided on the safety door and small door as above, it is easy to perform opening and closing using only one hand. However, for a safety door that is opened and closed by being pulled forwards, space is required on the outside for opening and closing, so for small work spaces, a sliding door such as the small door is desirable. However, to maintain an open state with a sliding door requires a lock mechanism that maintains the door in a raised position. Thus, with a sliding door, it is desirable that the lock mechanism for performing opening and closing can also being operated easily with one hand.

The present disclosure solves such problems, and an object thereof is to provide a vertically sliding manual opening and closing door that can be operated well with one hand.

A form of the present disclosure of a vertically sliding manual opening and closing door includes: a plate-like door member configured to open and close an opening section by being slid vertically; a support member configured to guide the vertical sliding of the door member by a support section configured to support left and right end sections of the door member; and a lock mechanism configured to position the door member that has been raised, wherein the lock mechanism includes a lock member attached to an external side surface of the door member, and biased to the external side by biasing force of a biasing member, an engaging member that is pushed in the outside direction with respect to the support member by the biasing force of the biasing member is formed on the lock member, and a receiving member is formed on the support member such that the engaging member of the lock member is inserted into the receiving member separating from the support member towards the outside.

Effects

According to the present disclosure, a receiving section is provided in the support member, and a lock member is integrally provided with the door member, such that when the door member is opened, the lock member provided with a biasing member automatically locks, thereby maintaining the door member in an open state, and when closing the door member, because releasing the lock and lowering the door member are performed by operation of the lock member, opening and closing operation is easy for an operator using only one hand.

DESCRIPTION OF EMBODIMENTS

Hereinafter, an embodiment of the present disclosure of a vertically sliding manual opening and closing door will be described with reference to the figures. With the present embodiment, as with the conventional example mentioned above, descriptions are given regarding a vertically sliding manual opening and closing door provided on a machine tool. In particular, the processing machine of the present embodiment configures a portion of processing machine line 1 of FIG. 1. Processing machine line 1 has six machine tools 5 loaded on base 2 acting as a foundation. Each of the six machine tools 5 is the same type of NC lathe, with the same outer shape and dimensions. Also, a work conveyance device that performs transfer of work between the machine tools 5 is provided on processing machine line 1.

Machine tool 5 has processing module 3 (refer to FIG. 2) loaded on base 2, and the processing portion of processing module 3 is covered by external cover 6. With processing machine line 1, front cover 7 that is capable of being opened and closed is provided on the front side of external cover 6, and the work conveyance device is arranged inside the conveyance chamber formed by front cover 7.

Figure 2:
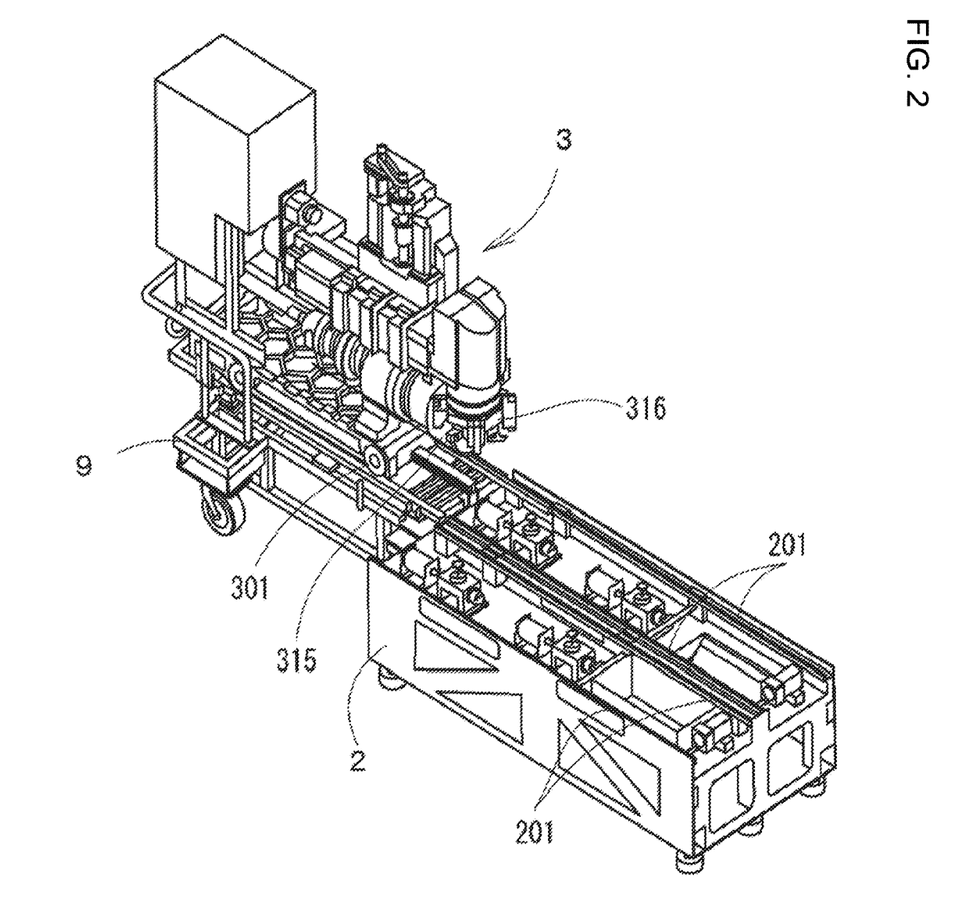
FIG. 2 is a perspective view of a processing module, which is the internal configuration of a machine tool.

With regard to this, FIG. 2 is a perspective view of processing module 3, which is the internal configuration of machine tool 5, with processing module 3 shown loaded on trolley 9 in a state pulled out from the rear of base 2. Only one processing module 3 is shown in the figure, but two processing modules 3 can be loaded on base 2. Therefore, there are two sets of rails 201 each provided on base 2 to match the width of processing module 3. Further, processing module 3 has wheels 301 to be loadable on base 2 in a state freely movable on rails 201.

Figure 1:
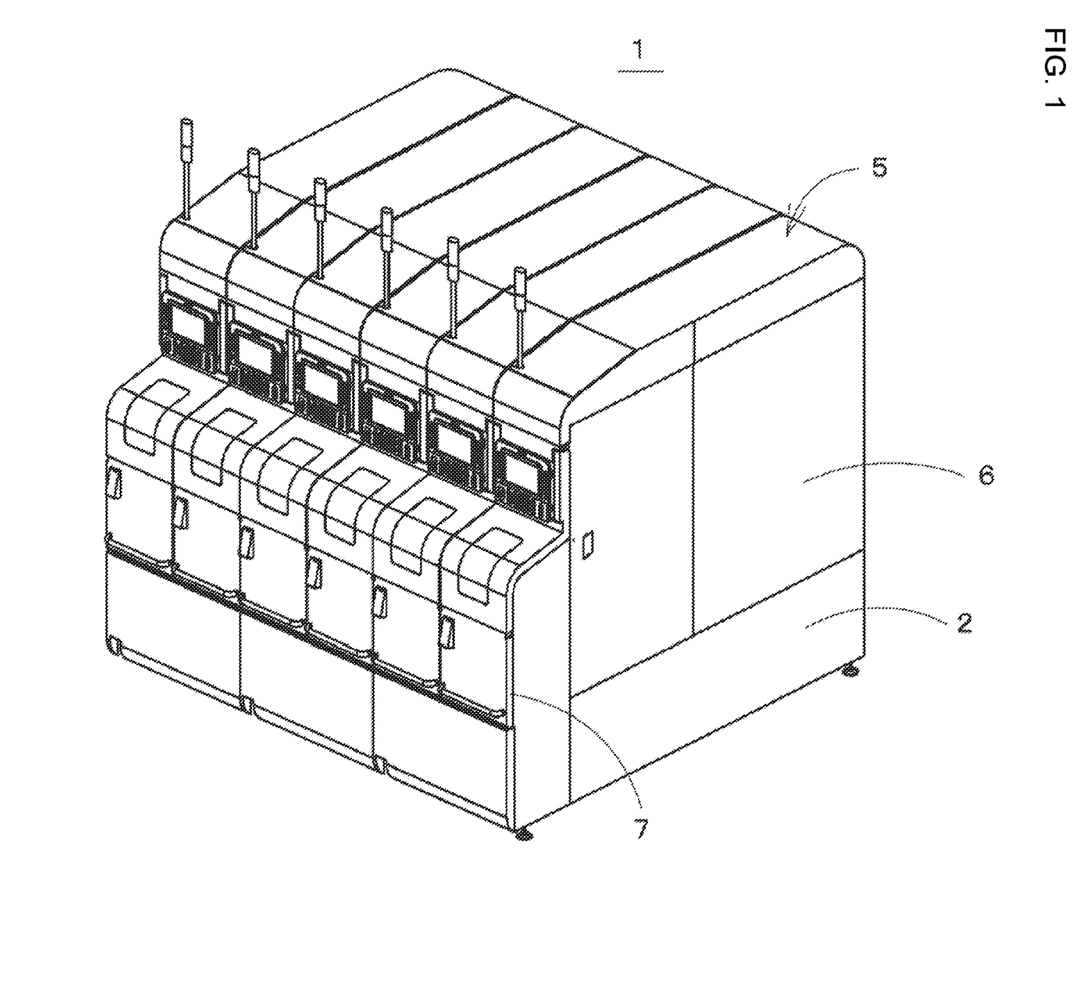
FIG. 1 is a perspective view of an embodiment of a processing machine line.
Figure 3:
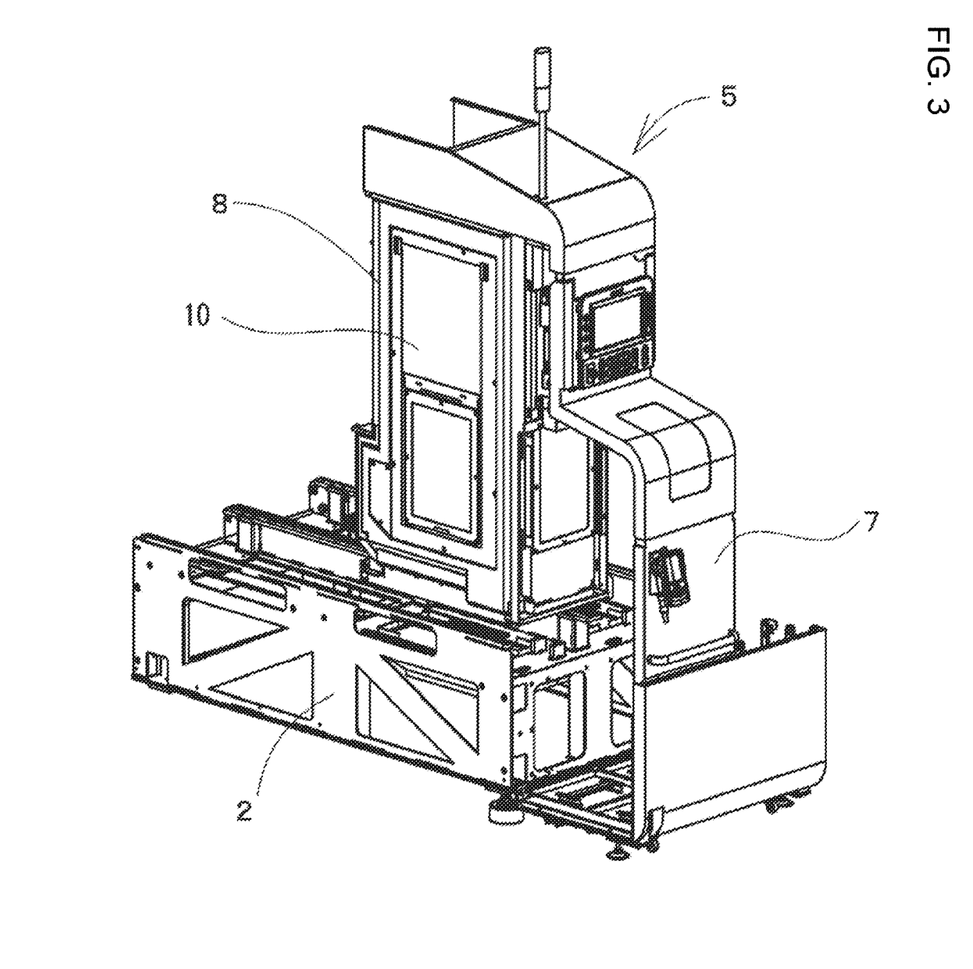
FIG. 3 is a perspective view showing a portion of a machine tool provided with a vertically sliding manual opening and closing door.

With processing machine line 1, even with machine tools 5 adjacent as shown in FIG. 1, because processing modules 3 can be pulled forward, work such as maintenance or tool exchange can be performed on each machine tools 5. Also, for machine tool 5, because internal cover 8 is provided inside external cover 8 as shown in FIG. 3, a processing section of main shaft chuck 315 and turret 316 (refer to FIG. 2) of processing module 3 is covered. FIG. 3 is a perspective view of a portion of machine tool 5, but the processing module and work conveyance device are not shown.

Work door 10 is provided on an outer wall of internal cover 8 of machine tool 5, and work such as maintenance or component exchange can be performed by opening work door 10. This work door 10 is the embodiment described below of a vertically sliding manual opening and closing door. Work door 10 has a thin construction such that the thickness is about the same as the outer wall of internal cover 8, so as not to encroach on the processing space of processing module 3 arranged inside the cover, and the configuration is such that the gap between work door 10 and external cover 6 arranged on the outside is extremely small. That is, work door 10 has a configuration that contributes to keeping the width dimension of outer cover 6 small while maintaining a large volume inside the processing chamber.

Figure 4:
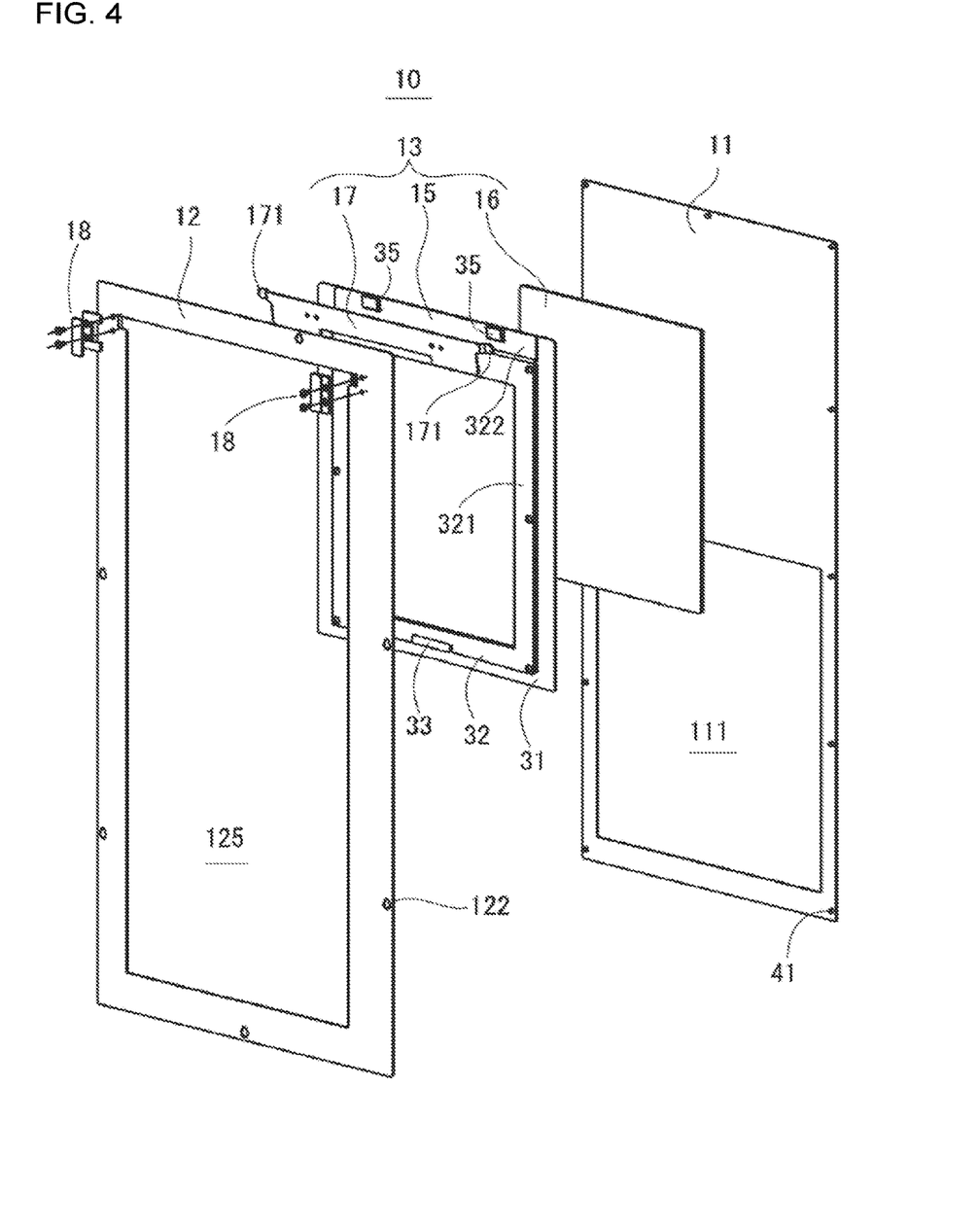
FIG. 4 is an exploded view of a vertically sliding manual opening and closing door.
Figure 5:
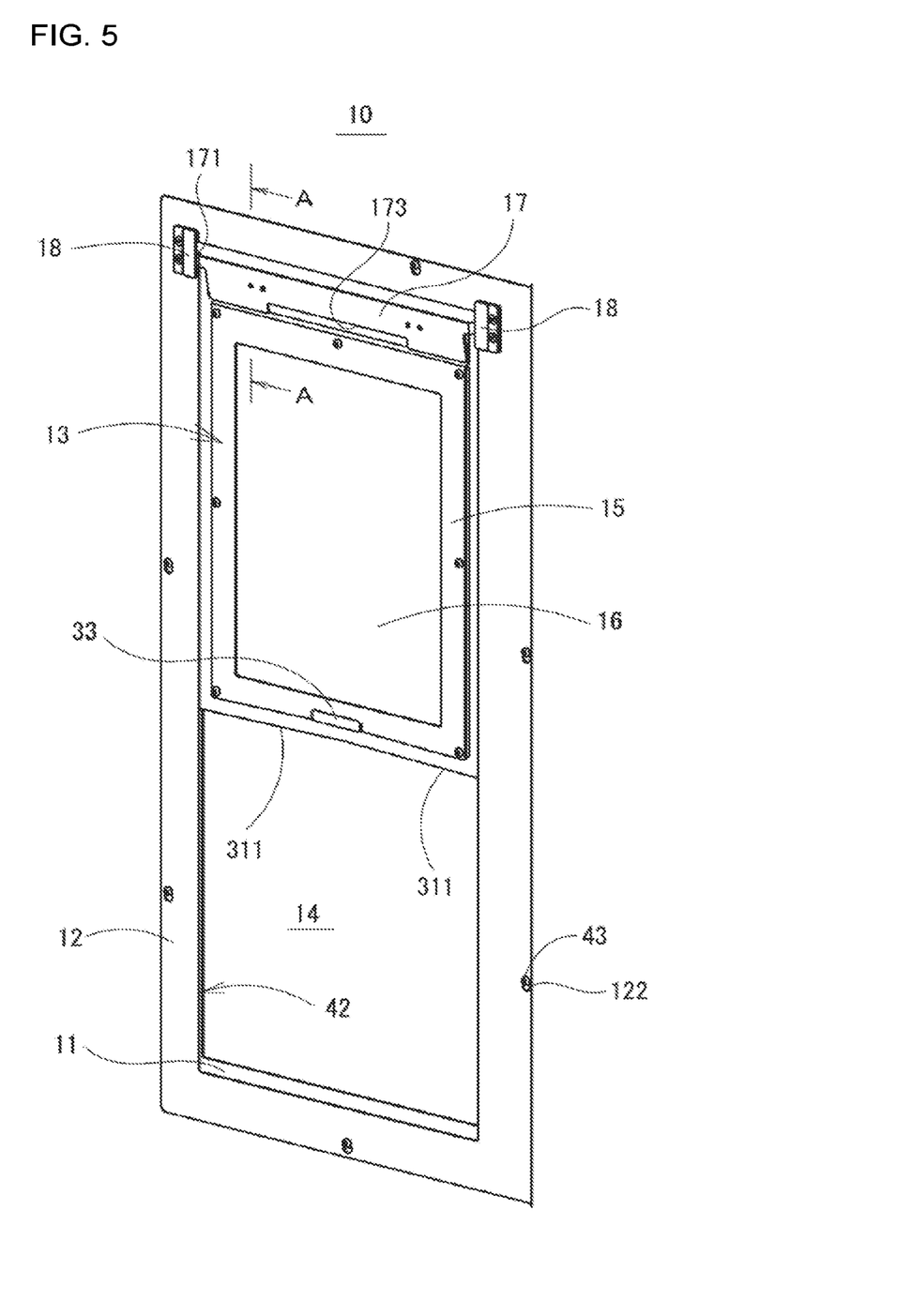
FIG. 5 shows the vertically sliding manual opening and closing door in an open state.

FIG. 4 is an exploded view of work door 10 and FIG. 5 shows work door 10 in an open state. With work door 10, rectangular inside frame 11 and larger rectangular outside frame 12 are overlapping, and door member 13 is slidably attached to guide section 42 formed from the gap between frames 11 and 12. Work door 10 is opened by door member 13 being moved from down to up, thereby forming opening section 14 that corresponds to the position of main shaft chuck 314 of processing module 3. Quadrilateral opening hole 111 is formed in the lower half of inside frame 11 to match the size of door member 13, and opening hole 125 is formed in outside frame 12 corresponding to the range in which door member 13 is raised and lowered.

Door member 13 is assembled as one unit from door frame 15, door plate 16, and lock plate 17. Door frame 15 is formed as one unit from overlapping first frame 31 and second frame 32 screwed together. Second frame 32 is provided with frame section 321 and upper end section 322, with a step formed between these two. Thus, upper end section 322 directly overlaps first frame 31, but overlaps frame section 321 via a spacer. Also, door plate 16 is sandwiched by first frame 31 and second frame 32, and forms one unit with door frame 15 to configure plate-shaped door member 13.

Also, thin block handle 33 is joined to door frame 15 at a central portion of the lower end section of second frame 32. When work door 10 is opened, an operator uses a finger to hold handle 33, and opens work door 10 by lifting up door member 13. Then, after door member 13 has been raised to open opening section 14, the open state must be maintained by holding door member 13 at that position.

Figure 6:
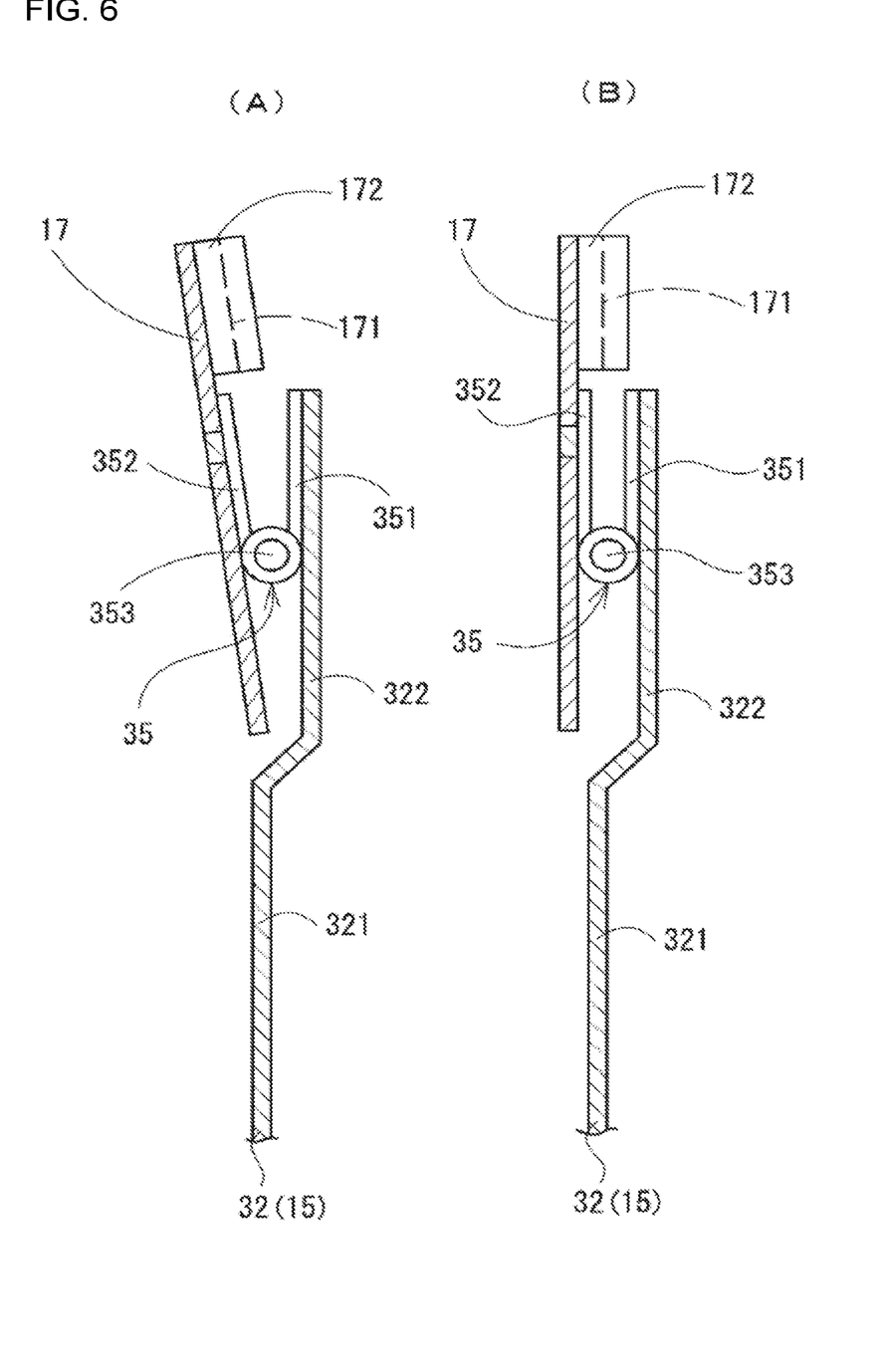
FIG. 6 is a cross-section view taken along A-A of FIG. 5 showing the relationship between a lock plate and door frame.

For this, a lock mechanism for maintaining the open state is provided on work door 10. FIG. 6 is a cross section view taken along A-A of FIG. 5 showing lock plate 17 that configures a lock mechanism.

With the lock mechanism on work door 10, lock plate 17 is attached to door frame 15, and receiver section 18 that supports lock plate 17 in a locked state is provided on outside frame 12. Lock plate 17 is attached at a portion at which upper end section 322 of door frame 15 is positioned, and is formed from a wide flat plate formed to match the width dimension of second frame 32. Spring hinge 35 is welded to upper end section 322 at two locations in the width direction, and lock plate 17 is welded to those spring hinges 35.

As shown in FIG. 6, spring hinge 35 is formed such that biasing force is applied to the pair of pin-linked support plates 351 and 352 in the open direction by a coil spring that is not shown. Spring hinges 35 are attached such that, with rotation shaft 353 at the bottom, the gap between support plates 351 and 352 widens as you move up. Therefore, lock plate 17 is inclined around rotation shaft 353 as shown in FIG. 6A with respect to vertical second frame 32 (door frame 15), especially with the upper end side biased to widen toward the outside of work door 10 (the direction separating from second frame 32.)

Further, the upper end of lock plate 17 extends both ways in the width direction to form protruding engaging sections 171. Engaging sections 171 are formed from stepped section 172 being folded back to the second frame 32 side, that is, in the direction behind door member 13. Engaging sections 171 are inserted into guide portion 42 between inside frame 11 and outside frame 12. Therefore, usually with lock plate 17, engaging sections 171 are pushed from the inside against outside frame 12 by the biasing force of spring hinges 35, thus restricting the inclination and causing an upright state as shown in FIG. 6B.

Also, a section of a specified width is cut out from the lower central portion of lock plate 17, thus forming handle section 173 that is recessed upwardly. Therefore, opening and closing operation of door member 13 may also be performed using handle section 173 as well as handle 33. However, handle section 173 is formed with the purpose of performing closing operation as the locking is released. For example, an operator may support the entire door member 13 by holding handle section 173 with a middle finger, index finger, or ring finger, and in that state push against lock plate 17 with their thumb. By pushing in this manner, lock plate 17 changes from the locked state of FIG. 6A to the unlocked state of FIG. 6B.

Figure 7:
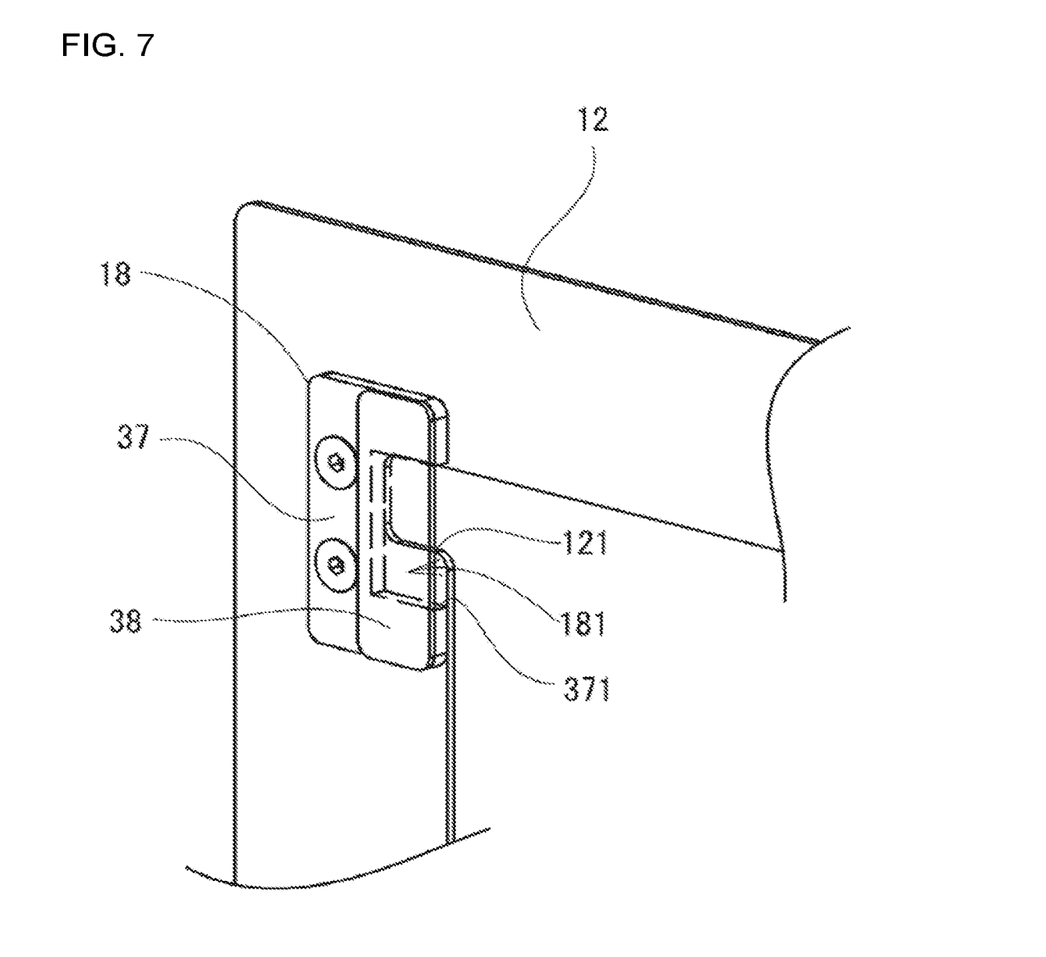
FIG. 7 is a perspective view of a receiving section.

Next, receiving sections 18 that support lock plate 17 in a locked state are provided at the upper corners of opening hole 125 of outside frame 12. This position is the position at which engaging portion 171 of lock plate 17 arrives when door member 13 is raised making work door 10 fully open. With regard to this, FIG. 7 is a perspective view of receiving section 18. Receiving section 18 is formed from cover plate 38 being joined as one unit with recessed receiving plate 37 that has cutout section 371 so as to cover cutout section 371, with receiving plate 37 being screwed to outer frame 12.

Cutout section 121 is formed in outside frame 12 at the upper corners of opening 125 at which receiving section 18 is positioned, with receiving plate 37 arranged to enclose this cutout section 121, with cover plate 38 covering from the outside. Cutout section 121 of outside frame 12 is formed with a size such that engaging section 171 of lock plate 17 passes through. Also, because cutout section 371 of receiving plate 37 is larger than cutout section 121, receiving channel 181 is formed as a space on the lower side of cutout section 121 by being surrounded by outside frame 12, receiving plate 37, and cover plate 38. Receiving channel 181 is an item into which engaging section 171 of lock plate 17 passed through cutout section 121 is received. Therefore, door member 13, by lock plate 17 being supported by receiving section 18, is maintained in a locked state as shown in FIG. 5.

However, with work door 10, an operator performs specified work by inserting a hand through opening section 14 that is open, but here there is a problem of liquid droplets dropping from raised door member 13. That is, a large amount of coolant liquid supplied during processing scatters and sticks to the back side of the processing chamber surrounded by internal covers 8. Here, when door member 13 is opened, because coolant liquid stuck to the back side falls towards opening section 14, this is very troublesome for an operator who is performing work by inserting a hand through opening section 14. Thus, in the present embodiment, inclined ends 311 that guide liquid droplets to the left and right sides are formed along the rear side of door member 13. Inclined ends 311 are formed on the lower end of first frame 31, and are inclined in a width direction from a central portion becoming lower towards the left and right sides. The inclination angle is about, for example, five to ten degrees.

Further, work door 10 is assembled as given below. That is, an opening section is formed at the rear wall of internal cover 8, and work door 10 is attached to cover that opening section. The assembly of work door 10 is such that inside frame 11 and outside frame 12 overlap and are fixed as one unit to sandwich door member 13. Here, a rear plate is welded to a circumferential edge portion of inside frame 11, with screw holes being formed in that rear plate. Further, bolts 41 are inserted from the rear side into the through-holes formed in the circumferential edge portion of inside frame 11, and attached to the screw holes of the rear plate. Here, guide section 42 that is the gap formed with outside frame 12 due to the rear plate is formed between inside frame 11 and outside frame 12.

Multiple drop-shaped attachment holes 122 are formed in the circumferential edge portion of outside frame 12 positioned on the outside of overlapping inside frame 11. Conversely, attachment screws 43 are fixed to the side wall of internal cover 8 at positions corresponding to attachment holes 122. Therefore, assembled work door 10 is attached to internal cover 8 easily by passing the heads of attachment screws 43 through attachment holes 122.

With work door 10 assembled in this manner, first frame 31 of door member 13 is inserted into guide portion 42. With door member 13, first frame 31 is guided and able to slide in a vertical direction by both end sections in the width direction being sandwiched in the thickness direction by inside frame 11 and outside frame 12. With door member 13, not only first frame 31, but also engaging sections 171 of lock plate 17 are inserted into guide portion 42 that is the gap between inside frame 11 and outside frame 12. Here, because lock plate 17 is biased to the outside by spring hinges 35, engaging sections 171 are always pushed against outside frame 12. Also, the biasing force of spring hinges 35 also acts on door member 13, thus preventing play of door member 13.

Next, when opening work door 10, an operator uses a finger to raise handle 33 of door member 13. Door member 13 slides up, and when in a fully open state, engaging sections 171 of lock plate 17 arrive at receiving sections 18. Until that point, engaging sections 171 push against the sides of outside frame 12, but upon arriving at receiving sections 18, they are released from guide portion 42 due to cutout sections 121, and enter receiving channels 181. At this time, lock plate 17 changes to a forwardly inclined state, as shown in FIG. 6A. Then, when the operator stops supporting door member 13, door member 13 lowers and engaging sections 171 fall into receiving channels 181, thus a locked state is achieved. Door member 13 is maintained in an open state hanging via lock plate 17.

Conversely, when closing work door 10, an operator uses a finger to hold handle 173 of lock plate 17, and raises door member 13 via lock plate 17. Therefore, door member 13 is raised such that engaging sections 171 go from receiving channels 181 to the position of cutout sections 121 of outside frame 12. Further, by the operator pushing lock plate 17 to the inside frame 11 side while keeping door member 13 raised, lock plate 17 changes to a vertical state, shown in FIG. 6B, against the biasing force of spring hinges 35, and engaging sections 171 return to guide portion 42. By this, the locking is released. Further, by the operator lowering door member 13 that is supported via lock plate 17, door member 13 slides down, and work door 10 returns to a closed state.

Thus, according to the present embodiment, by receiving sections 18 being formed in outside frame 12, and lock plate 17 being provided as one unit with door member 13, when door member 13 is opened, lock plate 17 provided with spring hinges 35 is automatically locked, and door member 13 is maintained in an open state; and when door member 13 is closed, the locking is released and door member 13 is lowered by operation of lock plate 17. Therefore, opening and closing of work door 10 can be performed by an operator using one hand.

Also, with the lock mechanism of work door 10, it is extremely easy to perform operation of releasing the lock and lowering to close the door with one hand by pushing lock plate 17 while fully supporting door member 13 by holding handle section 173 with a finger. Specifically, because lock plate 17 has handle section 173 the underside of which can be held by a finger, and spring hinges 35 with a rotation shaft 353 at an intermediate height and pushing locations of upper end sections opened to the outside, an operator supporting lock plate 17 can perform hand operations naturally. Further, with the lock mechanism of work door 10, lock plate 17 is a plate joined to spring hinges 35, and receiving sections 18 are formed by receiving plate 37 and cover plate 38 being fixed to outer frame 12 in which cutout sections 121 are formed, therefore the above effects can be achieved with a simple configuration using a small quantity of components.

Work door 10 has a configuration in which lock plate 17 is attached to the outside of door member 13 by spring hinges 35, and as shown in FIG. 6A, lock plate 17 slightly protrudes in the thickness direction of door member 13. Also, receiving plate 37 and cover plate 38 that configure receiving section 18 are thin plates, such that the locations protruding with respect to outside frame 12 are extremely slight. Thus, work door 10 has a flat construction that has substantially no locations that protrude with respect to internal cover 8. Therefore, external cover 6 can be arranged extremely close on the outside of internal cover 8, contributing to the small size in the width direction of machine tool 5. Further, with work door 10 of the present embodiment, liquid droplets are prevented from dropping onto opening section 14 by inclined ends 311 of door member 13, making work easy.

The above describes an embodiment of the present disclosure, but embodiments are not limited to these and various changes may be employed without departing from the scope of the disclosure. For example, the present embodiment is described using work door 10 of machine tool 5, but a vertically sliding manual open and closing door may be applied to various items and is not limited to a machine tool.

Also, in the present embodiment, receiving channel 181 is formed in receiving section 18, but for creating a locked state by engaging sections 171 being removed from guide portion 42, the configuration may be such that cutout section 371 of receiving plate 37 is the same size as cutout section 121, and there is no receiving channel 181.

Also, in the present embodiment, receiving section 18 is formed to correspond to door member 13 in a fully open position, but receiving section 18 may be formed at multiple locations instead of just one.

Further, a lock member may be an item other than lock plate 17, for example, an item formed by a frame. Also, instead of the lock member being attached to door member 13 by spring hinges 35, the lock member may be attached to door member using separate members of a hinge and a spring member.

Also, for example, door member 13 may be attached flipped in the vertical direction, and receiving section 18 may be arranged at an intermediate position in the height direction of outside frame 12.

Further, handle section 173 is an item for operating lock plate 17 using one hand. A different configuration may be used, so long as operation can be performed in a similar manner. For example, a handle may be arranged at the bottom of lock plate 17 in a similar manner to handle 33 at the bottom of door frame 15.

REFERENCE SIGNS LIST

5: machine tool; 6: external cover; 3: processing module; 8: internal cover; 10: work door; 11: inside frame; 12: outside frame; 13: door member; 14: opening section; 17: lock plate; 18: receiving section; 35: spring hinge; 42: guide portion; 171: engaging section

The invention claimed is:

1. A vertically sliding manual opening and closing door comprising:
   a door member configured to open and close an opening section by being slid vertically;
   a support member configured to guide the vertical sliding of the door member by a support section configured to support left and right end sections of the door member; and
   a lock mechanism configured to position the door member that has been raised, wherein
   the lock mechanism includes a lock member attached to an external side surface of the door member and biased to an external side of the lock mechanism by a biasing force of a biasing member, and includes an engaging member that is pushed in an outside direction with respect to the support member by the biasing force of the biasing member formed on the lock member,
   the support member includes a cutout portion corresponding to a size of the engaging member, the engaging member configured to pass through the cutout portion when engaged with the cutout portion,
   the support member includes a receiving member that receives the engaging member of the lock member from the cutout portion, the receiving member extending outward from a face of the support member, and
   the receiving member includes a cover plate that covers the cutout portion.

2. The vertically sliding manual opening and closing door according to claim 1, wherein
   the lock member is formed from a flat plate, and the engaging member extends in a width direction of the lock member.

3. The vertically sliding manual opening and closing door according to claim 2, wherein,
   a handle formed on a bottom end portion of the lock member, the handle being recessed upwards.

4. The vertically sliding manual opening and closing door according to claim 1, wherein
   the biasing member is a spring hinge with a biasing force acting in an opening direction by a spring member that is a pair of pin-linked support plates, the support plates having a rotation shaft underneath and being connected to the door member and the lock member, and an upper side of the lock member is positioned further to the external side of the lock member than a lower side of the lock member when the lock member is in a locked state with the support member.

5. The vertically sliding manual opening and closing door according to claim 1, wherein
   the receiving member is larger in a vertical direction than the cutout portion, and
   the engaging member enters the receiving section from below the cutout portion.

6. The vertically sliding manual opening and closing door according to claim 1, wherein
   a lower end of the door member includes is an inclined end that is inclined downwards towards both left and right ends in the width direction of the door member from a center of the inclined end.

7. The vertically sliding manual opening and closing door according to claim 1, wherein
   the engaging member is pushed outward in the outside direction to a released state when the lock mechanism is raised so that the engaging member aligns with the cutout portion, and
   the engaging member in the released state enters the receiving member and locks the door member by hanging in the receiving member.

* * * * *